(12) United States Patent
Ohashi et al.

(10) Patent No.: US 11,883,797 B2
(45) Date of Patent: Jan. 30, 2024

(54) EXHAUST GAS PURIFICATION CATALYST DEVICE

(71) Applicant: CATALER CORPORATION, Kakegawa (JP)

(72) Inventors: Tatsuya Ohashi, Kakegawa (JP); Kohei Takasaki, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 207 days.

(21) Appl. No.: 17/598,994

(22) PCT Filed: Mar. 3, 2020

(86) PCT No.: PCT/JP2020/008991
§ 371 (c)(1),
(2) Date: Sep. 28, 2021

(87) PCT Pub. No.: WO2020/202990
PCT Pub. Date: Oct. 8, 2020

(65) Prior Publication Data
US 2022/0176352 A1 Jun. 9, 2022

(30) Foreign Application Priority Data
Mar. 29, 2019 (JP) .................. 2019-069152

(51) Int. Cl.
*B01J 21/04* (2006.01)
*B01J 23/44* (2006.01)
(Continued)

(52) U.S. Cl.
CPC .............. *B01J 23/44* (2013.01); *B01J 21/04* (2013.01); *B01J 23/464* (2013.01);
(Continued)

(58) Field of Classification Search
CPC . B01J 21/04; B01J 23/44; B01J 23/464; B01J 35/0006; B01J 35/04; F01N 3/10
(Continued)

(56) References Cited

U.S. PATENT DOCUMENTS 5,248,650 A * 9/1993 Sekiba ................ B01D 53/945
502/303
5,376,610 A 12/1994 Takahata et al.
(Continued)

FOREIGN PATENT DOCUMENTS

EP 2047903 B1 10/2015
JP H05-293376 A 11/1993
(Continued)

OTHER PUBLICATIONS

Nov. 16, 2022 Extended European Search Report Issued in European Patent Application No. 20782686.8.
(Continued)

*Primary Examiner* — Cam N. Nguyen
(74) *Attorney, Agent, or Firm* — Oliff PLC (57) ABSTRACT

An exhaust gas purification catalyst device having a substrate, a first catalyst coating layer on the substrate, and a second catalyst coating layer on the first catalyst coating layer. The first catalyst coating layer includes inorganic oxide particles, palladium carried on the inorganic oxide particles, and a barium compound. The second catalyst coating layer includes alumina particles and rhodium carried by the alumina particles. The ratio ($M_{Ba}/M_{Rh}$) between the mass ($M_{Ba}$) of barium in the first catalyst coating layer and the mass ($M_{Rh}$) of rhodium in the second catalyst coating layer is 5.0-60.0 inclusive.

17 Claims, 2 Drawing Sheets

(51) Int. Cl.
   *B01J 23/46*   (2006.01)
   *B01J 35/00*   (2006.01)
   *B01J 35/04*   (2006.01)
   *F01N 3/10*    (2006.01)
   *B01J 37/02*   (2006.01)

(52) U.S. Cl.
   CPC ....... *B01J 35/0006* (2013.01); *B01J 37/0215* (2013.01); *F01N 3/10* (2013.01); *F01N 2510/0684* (2013.01)

(58) Field of Classification Search
   USPC .......... 502/304, 328, 332, 334, 339, 527.12, 502/527.13
   See application file for complete search history.

(56) References Cited

U.S. PATENT DOCUMENTS

| | | | | |
|---|---|---|---|---|
| 5,753,580 | A * | 5/1998 | Hayashi | B01J 23/63 502/340 |
| 5,958,826 | A * | 9/1999 | Kurokawa | F01N 3/0835 422/177 |
| 6,420,306 | B2 * | 7/2002 | Kurokawa | B01J 23/63 502/262 |
| 6,500,392 | B2 * | 12/2002 | Mizuno | B01D 53/945 502/328 |
| 7,276,212 | B2 * | 10/2007 | Hu | B01J 23/63 422/177 |
| 7,767,164 | B2 * | 8/2010 | Matsuzono | F01N 3/106 422/177 |
| 8,950,174 | B2 * | 2/2015 | Hilgendorff | B01J 35/023 60/299 |
| 9,517,462 | B2 * | 12/2016 | Roesch | B01J 23/63 |
| 9,597,665 | B2 * | 3/2017 | Nagao | B01J 23/58 |
| 10,118,156 | B2 * | 11/2018 | Horaguchi | B01J 37/08 |
| 10,737,219 | B2 * | 8/2020 | Onozuka | B01J 23/10 |
| 10,765,998 | B2 * | 9/2020 | Katoh | B01J 35/0073 |
| 11,110,435 | B2 * | 9/2021 | Onoe | B01J 35/0006 |
| 2013/0150236 | A1 | 6/2013 | Aoki | |
| 2014/0038812 | A1 * | 2/2014 | Hori | B01J 37/0244 502/304 |
| 2016/0199816 | A1 | 7/2016 | Matsueda et al. | |
| 2019/0083932 | A1 | 3/2019 | Onozuka et al. | |
| 2019/0136730 | A1 * | 5/2019 | Onozuka | B01D 53/9445 |
| 2019/0291083 | A1 | 9/2019 | Komata et al. | |
| 2022/0055021 | A1 * | 2/2022 | Liu | B01D 53/9472 |
| 2022/0161236 | A1 * | 5/2022 | Vjunov | B01J 23/42 |
| 2022/0193639 | A1 * | 6/2022 | Vjunov | B01J 37/0244 |

FOREIGN PATENT DOCUMENTS

| | | |
|---|---|---|
| JP | 2005-279437 A | 10/2005 |
| JP | 2009-019537 A | 1/2009 |
| JP | 2010-005566 A | 1/2010 |
| JP | 2012-152702 A | 8/2012 |
| JP | 2013-119075 A | 6/2013 |
| JP | 2014-18724 A | 2/2014 |
| JP | 2016-185531 A | 10/2016 |
| WO | 2017/163985 A1 | 9/2017 |
| WO | 2018/016606 A1 | 1/2018 |

OTHER PUBLICATIONS

May 12, 2020 Search Report issued in International Patent Application No. PCT/JP2020/008991.

May 12, 2020 Written Opinion issued in International Patent Application No. PCT/JP2020/008991.

Sep. 28, 2021 International Preliminary Report on Patentability issued in International Patent Application No. PCT/JP2020/008991.

* cited by examiner

EXHAUST GAS PURIFICATION CATALYST DEVICE

FIELD

The present invention relates to an exhaust gas purification catalytic device.

BACKGROUND

As an exhaust gas purification catalyst for purifying exhaust gas discharged from automobiles, a supported catalyst in which a noble metal having catalytic activity is supported on particles composed of an inorganic oxide has been known. It is known that, for example, palladium and platinum have the catalytic activity to oxidize and convert hydrocarbons (HCs) and carbon monoxide (CO) into water and carbon dioxide, and rhodium has the catalytic activity to reduce and convert nitrogen oxides ($NO_x$) into nitrogen.

As a catalyst for exhaust gas purification, it is desirable to have a configuration in which a plurality of noble metals are arranged in a well-balanced manner.

However, it is known that when palladium or platinum is present in close proximity with rhodium in a catalyst, these noble metals migrate and alloy with each other in the catalyst while the catalyst is used, resulting in impaired catalytic activity. Various techniques have been proposed to avoid this.

PTL 1 proposes a catalyst for exhaust gas purification in which a catalytic coating layer comprises a two-layer structure with an upper layer and a lower layer, wherein the upper layer has rhodium supported on the surface thereof and the lower layer has palladium or platinum arranged therein. PTL 1 describes that when such a catalyst is used, HCs, CO, and NOx can be purified efficiently, and the deterioration of catalytic activity caused by alloying is suppressed.

However, even when rhodium and palladium or platinum are separated and supported in an upper layer and a lower layer, noble metals, particularly rhodium, migrate across the layer boundary in a high-temperature region and alloying occurs. Thus, there is a problem that the effect of separately supporting the noble metals is reduced.

PTL 2 proposes a catalyst for exhaust gas purification comprising a first catalytic layer (lower layer) containing platinum and an additive element (e.g., barium) and a second catalytic layer (upper layer) containing rhodium, wherein the additive element in the first catalytic layer is distributed so as to have a higher concentration approaching the second catalytic layer. PTL 2 describes that due to this configuration, the migration of rhodium and the associated alloying can be suppressed.

PTL 3 proposes a catalyst for exhaust gas purification composed of an upper layer comprising an alumina-added ceria-zirconia composite oxide carrier and rhodium supported thereon and a lower layer comprising a lanthanum-added alumina carrier, palladium supported thereon, and barium sulfate. PTL 3 describes that a catalyst having such a configuration can maintain catalytic performance even after long-term use.

In actual driving, automobiles repeatedly accelerate and decelerate while running. During acceleration and deceleration, the air-fuel ratio (A/F) rapidly increases or decreases, which affects, for example, the purification rate of HCs. Therefore, for the purpose of mitigating fluctuations of the A/F value due to acceleration/deceleration, a technique of blending a material (OSC material) that exhibits oxygen storage capacity within the catalytic coating layer has been known.

PTL 4, for example, discloses a catalyst for exhaust gas purification comprising a honeycomb-shaped monolith having thereon a lower layer and an upper layer, wherein a layer comprising a Rh/OSC material, which consists of Rh (rhodium) supported on an OSC material, is arranged in the lower layer and a layer comprising Pd/alumina, which consists of Pd supported on alumina, is arranged in the upper layer.

CITATION LIST

Patent Literature

[PTL 1] Japanese Unexamined Patent Publication (Kokai) No. 05-293376

[PTL 2] Japanese Unexamined Patent Publication (Kokai) No. 2015-279437

[PTL 3] Japanese Unexamined Patent Publication (Kokai) No. 2016-185531

[PTL 4] Japanese Unexamined Patent Publication (Kokai) No. 2010-5566

SUMMARY

Technical Problem

In the prior art, the suppression of the migration and alloying of noble metals (particularly rhodium) is insufficient, and the concern regarding the deterioration of catalytic activity caused by alloying remains. Specifically, even with the techniques of PTL 2 and 3, the phenomenon of rhodium migrating across a layer boundary in a high-temperature region is not entirely suppressed, and improvement in this regard is required.

Regulations on exhaust gas discharged from automobiles have become stricter year after year. Test cycles in a mode closer to actual driving have been adopted as tests of exhaust gas purification ability. For example, the European Parliament has adopted the RDE (Real Driving Emissions) Regulation, and the U.S. Environmental Protection Agency has established modes such as LA #4. Particularly, the demand for $NO_x$ purification ability has been increasing.

The demand for improved fuel efficiency and the number of vehicles which are controlled to stop warm-up operation when stopped have been increasing.

In such circumstances, improvements in the HC purification ability in a low-temperature state at engine start, the $NO_x$ purification ability in the transitional period after engine restart, and the $NO_x$ purification ability in a region where the space velocity (SV) is high are required. However, these performances are still insufficient with the exhaust gas purification catalysts of the prior art.

The present invention has been made in view of the above circumstances. The object of the present invention is to provide an exhaust gas purification catalytic device, in which deterioration of catalytic activity caused by alloying of noble metals in a high-temperature region is sufficiently suppressed, having a high low-temperature purification ability of HCs and a high $NO_x$ purification ability in a transitional period and a high SV region.

Solution to Problem

The present invention is described as follows.

<<Aspect 1>>

An exhaust gas purification catalytic device, comprising a substrate, a first catalytic coating layer on the substrate, and a second catalytic coating layer on the first catalytic coating layer, wherein:

the first catalytic coating layer comprises inorganic oxide particles, palladium supported on the inorganic oxide particles, and a barium compound, the second catalytic coating layer comprises alumina particles and rhodium supported on the alumina particles, and the ratio ($M_{Ba}/M_{Rh}$) of the mass ($M_{Ba}$) of barium in the first catalytic coating layer to the mass ($M_{Rh}$) of rhodium in the second catalytic coating layer is 5.0 or greater and 60.0 or less.

<<Aspect 2>>

The exhaust gas purification catalytic device according to Aspect 1, wherein the ratio ($M_{Ba}/M_{Rh}$) of the mass ($M_{Ba}$) of barium in the first catalytic coating layer to the mass ($M_{Rh}$) of rhodium in the second catalytic coating layer is 6.0 or greater and 58.0 or less.

<<Aspect 3>>

The exhaust gas purification catalytic device according to Aspect 2, wherein the ratio ($M_{Ba}/M_{Rh}$) of the mass ($M_{Ba}$) of barium in the first catalytic coating layer to the mass ($M_{Rh}$) of rhodium in the second catalytic coating layer is 10.0 or greater and 40.0 or less.

<<Aspect 4>>

The exhaust gas purification catalytic device according to any one of Aspects 1 to 3, wherein the first catalytic coating layer has a ratio ($Pd_{Fr}/Pd_{Rr}$) of an amount ($Pd_{Fr}$) of palladium contained in a range up to 20% of the total length of the substrate from an exhaust gas flow upstream end portion to an amount ($Pd_{Rr}$) of palladium contained in a range up to 20% of the total length of the substrate from an exhaust gas flow downstream end portion of greater than 1.0 and 3.0 or less.

<<Aspect 5>>

The exhaust gas purification catalytic device according to any one of Aspects 1 to 4, wherein the second catalytic coating layer has a ratio ($Rh_{Fr}/Rh_{Rr}$) of an amount ($Rh_{Fr}$) of rhodium contained in a range up to 20% of the total length of the substrate from an exhaust gas flow upstream end portion to an amount ($Rh_{Rr}$) of rhodium contained in a range up to 20% of the total length of the substrate from an exhaust gas flow downstream end portion of 0.90 or greater and 1.10 or less.

<<Aspect 6>>

The exhaust gas purification catalytic device according to any one of Aspects 1 to 5, wherein the first catalytic coating layer comprises oxygen storage/release material particles and particles of an inorganic oxide other than an oxygen storage/release material.

<<Aspect 7>>

The exhaust gas purification catalytic device according to Aspect 6, wherein the palladium in the first catalytic coating layer is supported on particles of an inorganic oxide other than an oxygen storage/release material.

<<Aspect 8>>

The exhaust gas purification catalytic device according to any one of Aspects 1 to 7, wherein the second catalytic coating layer further comprises oxygen storage/release material particles.

<<Aspect 9>>

The exhaust gas purification catalytic device according to any one of Aspects 1 to 8, wherein the oxygen storage/release material particles in the first catalytic coating layer and the second catalytic coating layer are, respectively, particles of one or more inorganic oxides selected from pure ceria and a composite oxide containing ceria.

<<Aspect 10>>

The exhaust gas purification catalytic device according to Aspect 9, wherein the composite oxide containing ceria is a ceria-zirconia composite oxide.

Advantageous Effects of Invention

The exhaust gas purification catalytic device of the present invention sufficiently suppresses the deterioration of catalytic activity caused by alloying of noble metals in a high-temperature region, as well as having a high low-temperature purification ability of HCs and a high $NO_x$ purification ability in a transitional period and a high SV region.

DESCRIPTION OF EMBODIMENTS

<<Exhaust Gas Purification Catalytic Device>>

The exhaust gas purification catalytic device of the present invention comprises a substrate, a first catalytic coating layer on the substrate, and a second catalytic coating layer on the first catalytic coating layer, wherein:

the first catalytic coating layer comprises inorganic oxide particles, palladium supported on the inorganic oxide particles, and a barium compound, the second catalytic coating layer comprises alumina particles and rhodium supported on the alumina particles, and the ratio ($M_{Ba}/M_{Rh}$) of the mass ($M_{Ba}$) of barium in the first catalytic coating layer to the mass ($M_{Rh}$) of rhodium in the second catalytic coating layer is 5.0 or greater and 60.0 or less. In other words, the rhodium in the second catalytic coating layer is supported on alumina, and the amount of barium in the first catalytic coating layer is limited with respect to the amount of rhodium in the second catalytic coating layer.

Due to this configuration, the exhaust gas purification catalytic device of the present invention suppresses the migration of rhodium across the layer boundary. As a result, deterioration of catalytic activity caused by the alloying of rhodium and palladium can be suppressed.

In the exhaust gas purification catalytic device of the present invention, rhodium in the second catalytic coating layer is supported on alumina particles. The alumina particles have a comparatively large specific surface area among the inorganic oxides that can support a noble metal, and thus have many rhodium adsorption sites and can securely support and retain a significant amount of rhodium on the alumina particles. Therefore, it is considered to be more difficult for rhodium to migrate when supported on alumina particles than when supported on other inorganic oxides.

Barium compounds have a function of capturing sulfur contained in exhaust gas and suppressing the deterioration of catalytic activity caused by the poisoning of palladium, and thus are often used with palladium in an exhaust gas purification catalytic device. However, barium compounds have a high affinity for rhodium and attract rhodium ionically or through an acid-base interaction, promoting the migration of rhodium across a layer boundary. In the exhaust gas purification catalytic device of the present invention, the amount of barium in the first catalytic coating layer is limited with respect to the amount of rhodium in the second catalytic coating layer, and thereby the migration of rhodium across a layer boundary can be limited.

Combined with the two effects described above, the migration of rhodium in a high-temperature region is suppressed in the exhaust gas purification catalytic device of the present invention, to an extent that the prior art has not been able to achieve.

The exhaust gas purification device of the present invention preferably has, in the first catalytic coating layer, a ratio ($Pd_{Fr}/Pd_{Rr}$) of an amount ($Pd_{Fr}$) of palladium contained in a range up to 20% of the total length of a substrate from an exhaust gas flow upstream end portion to an amount ($Pd_{Rr}$) of palladium contained in a range up to 20% of the total length of the substrate from an exhaust gas flow downstream end portion of greater than 1.0 or greater and 3.0 or less. In other words, more palladium is arranged on the exhaust gas flow upstream side in the first catalytic coating layer (lower layer) of the exhaust gas purification device.

Due to this configuration, the exhaust gas purification catalytic device of the present invention is able to "ignite" the catalyst on the upstream side of the catalytic coating layer, even when the catalyst bed temperature is comparatively low, and HC purification at low temperature can be carried out smoothly. In addition thereto, a reaction between the HCs, CO, and $NO_x$ occurs on the upstream side of the catalytic coating layer, and the heat of reaction therefrom can promote exhaust gas purification on the downstream side of the catalytic coating layer.

The exhaust gas purification device of the present invention preferably has, in the second catalytic coating layer, a ratio ($Rh_{Fr}/Rh_{Rr}$) of an amount ($Rh_{Fr}$) of rhodium contained in a range up to 20% of the total length of a substrate from an exhaust gas flow upstream end portion to an amount ($Rh_{Rr}$) of rhodium contained in a range up to 20% of the total length of the substrate from an exhaust gas flow downstream end portion of 0.90 to 1.10. In other words, in the second catalytic coating layer (upper layer) of the exhaust gas purification device, rhodium is arranged substantially evenly in the length direction of the substrate.

Due to this configuration, the exhaust gas purification catalytic device of the present invention can suppress a "blowout", in which NOx passes through the catalytic coating layer unreacted, in a high-load region such as a high SV period, and can improve the purification rate of $NO_x$ in a high-load region.

Figure 1:
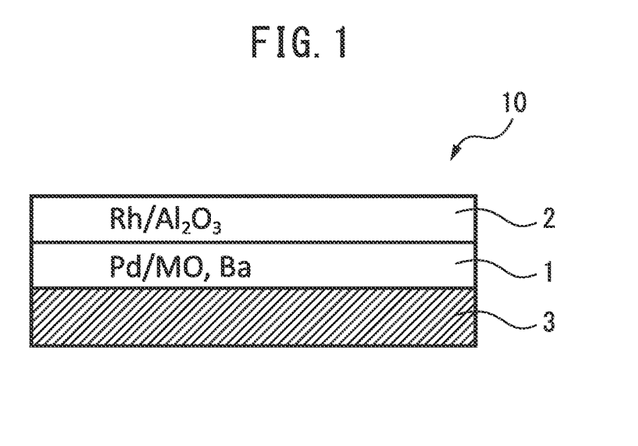
FIG. 1 is a schematic cross-sectional view showing one example of the configuration of the exhaust gas purification catalytic device of the present invention.
Figure 2:
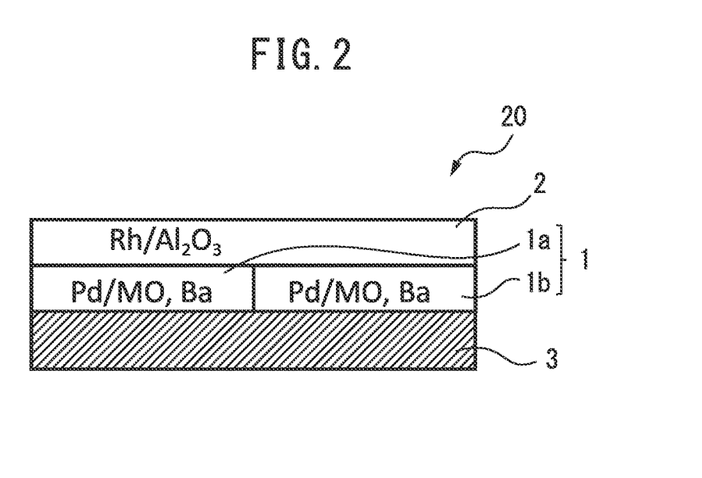
FIG. 2 is a schematic cross-sectional view showing another example of the configuration of the exhaust gas purification catalytic device of the present invention.

FIG. 1 and FIG. 2 show configurations of the exhaust gas purification catalytic device of the present invention.

The exhaust gas purification catalytic device (10) of FIG. 1 comprises a substrate (3), a first catalytic coating layer (1) on the substrate (3), and a second catalytic coating layer (2) on the first catalytic coating layer (1).

The first catalytic coating layer (1) comprises inorganic oxide particles (MO), palladium (Pd), and a barium compound (Ba). The palladium (Pd) in the first catalytic coating layer (1) is supported on the inorganic oxide particles (MO) and contained in the first catalytic coating layer (1) as palladium supported inorganic oxide particles (Pd/MO).

The second catalytic coating layer (2) comprises alumina particles ($Al_2O_3$) and rhodium (Rh). The rhodium (Rh) in the second catalytic coating layer (2) is supported on the alumina particles ($Al_2O_3$) and contained in the second catalytic coating layer (2) as rhodium supported alumina particles ($Rh/Al_2O_3$).

The ratio ($M_{Ba}/M_{Rh}$) of the mass ($M_{Ba}$) of barium in the first catalytic coating layer (1) to the mass ($M_{Rh}$) of rhodium in the second catalytic coating layer (2) is 5.0 or greater and 60.0 or less. The mass ($M_{Ba}$) of barium in the first catalytic coating layer (1) and the mass ($M_{Rh}$) of rhodium in the second catalytic coating layer (2) are both metal-equivalent values.

The exhaust gas purification catalytic device (20) of FIG. 2 is substantially the same as the exhaust gas purification catalytic device (10) of FIG. 1. However, the first catalytic coating layer (1) on the substrate (3) has a first catalytic coating layer front-stage portion (1a) on the exhaust gas flow upstream side and a first catalytic coating layer back-stage portion (1b) on the exhaust gas flow downstream side. This case is also encompassed in the preferred embodiment of the present invention.

Hereinafter, each element constituting the exhaust gas purification catalytic device of the present invention will be detailed in order.

<Substrate>

For the substrate in the exhaust gas purification catalytic device of the present invention, a substrate commonly used as the substrate of an exhaust gas purification catalytic device can be used. The substrate may be, for example, a straight-type or wall flow-type monolithic honeycomb substrate made of a material such as cordierite, SiC, stainless steel, and inorganic oxide particles.

<First Catalytic Coating Layer>

The exhaust gas purification catalytic device of the present invention comprises a first catalytic coating layer on the substrate. The first catalytic coating layer comprises inorganic oxide particles, palladium supported on the inorganic oxide particles, and a barium compound, and may further comprise an optional component in addition thereto. The optional component in the first catalytic coating layer may be, for example, a noble metal other than palladium or a binder.

(Palladium)

The first catalytic coating layer comprises palladium. The palladium in the first catalytic coating layer is supported on the inorganic oxide particles as described below.

The amount of palladium in the first catalytic coating layer may be appropriately determined according to the application of the exhaust gas purification catalytic device. From the viewpoint of ensuring good exhaust gas purification activity, the metal-palladium equivalent value per 1 L of substrate capacity may be, for example, 0.5 g-Pd/L or more, 1.0 g/L or more, 1.5 g-Pd/L or more, 2.0 g-Pd/L or more, 2.5 g-Pd/L or more, or 3.0 g-Pd/L or more. From the viewpoint of controlling the amount of palladium that does not contribute to the exhaust gas purification reaction and not making the exhaust gas purification catalytic device overly expensive, the value may be, for example, 10.0 g-Pd/L or less, 9.0 g-Pd/L or less, 8.0 g-Pd/L or less, 7.0 g-Pd/L or less, 6.0 g-Pd/L or less, or 5.0 g-Pd/L or less.

In the first catalytic coating layer, more palladium may be arranged on the exhaust gas flow upstream side. Due to this configuration, even when the catalyst bed temperature is comparatively low, it is possible to "ignite" the catalyst on the upstream side of the catalytic coating layer, whereby HC purification at low temperature can be carried out smoothly. Additionally, a reaction between the HCs, CO, and $NO_x$ occurs on the upstream side of the catalytic coating layer, and the heat of reaction therefrom can promote exhaust gas purification on the downstream side of the catalytic coating layer, offering an advantage.

From the viewpoint of effectively exhibiting the effect described above, the ratio ($Pd_{Fr}/Pd_{Rr}$) of the amount ($Pd_{Fr}$) of palladium contained in a range up to 20% of the total length of the substrate from an exhaust gas flow upstream end portion to the amount ($Pd_{Rr}$) of palladium contained in a range up to 20% of the total length of the substrate from an exhaust gas flow downstream end portion in the first catalytic coating layer may be, for example, greater than 1.0, 1.1 or greater, 1.2 or greater 1.3 or greater, 1.4 or greater, or 1.5 or greater. From the viewpoint of not impairing the exhaust gas purification reaction on the exhaust gas flow downstream side of the first catalytic coating layer, the ratio may be, for example, 3.0 or less, 2.8 or less, 2.6 or less, 2.4 or less, 2.2 or less, 2.0 or less, 1.8 or less, or 1.6 or less.

To arrange more palladium on the exhaust gas flow upstream side in the first catalytic coating layer, for example, the first catalytic coating layer may have a "zonal structure" including a front-stage portion of the exhaust gas flow upstream side and a back-stage portion of the exhaust gas flow downstream side. When the first catalytic coating layer has a zonal structure including a front-stage portion and a back-stage portion, there may be a region in which the front-stage portion and the back-stage portion are stacked on the substrate near the center in the length direction of the substrate.

(Noble Metals Other than Palladium)

The first catalytic coating layer may or may not comprise a noble metal other than palladium. The noble metal other than palladium may be, for example, rhodium or platinum.

If the first catalytic coating layer comprises rhodium, the advantageous effect of the present invention due to the arrangement of palladium and rhodium in different layers is impaired. Thus, it is preferable that the first catalytic coating layer be substantially free of rhodium. The "substantially free of rhodium" in the first catalytic coating layer means that the ratio of the mass of rhodium to the total mass of a noble metal catalyst contained in the first catalytic coating layer may be, for example, 10% by mass or less, 5% by mass or less, 3% by mass or less, 1% by mass or less, 0.5% by mass or less, 0.3% by mass or less, 0.1% by mass or less, or 0% by mass.

The first catalytic coating layer may or may not comprise platinum with palladium.

(Barium Compound)

The first catalytic coating layer comprises a barium compound. When the first catalytic coating layer comprises a barium compound, for example, sulfur contained in the exhaust gas is captured, and deterioration of catalytic activity caused by poisoning of palladium can be suppressed.

The barium compound may be, for example, barium sulfate, barium nitrate, barium carbonate, barium oxyacid salt (excluding sulfate, nitrate, and carbonate), and barium oxide.

To effectively exhibit the effect of blending the barium compound into the first catalytic coating layer, the amount of barium compound in the first catalytic coating layer as a metal-barium equivalent value per 1 L of substrate capacity may be, for example, 1 g-Ba/L or more, 2 g-Ba/L or more, 5 g-Ba/L or more, 10 g-Ba/L or more, or 15 g-Ba/L or more. From the viewpoint of suppressing an adverse effect on rhodium in the second catalytic coating layer, the value may be, for example, 30 g-Ba/L or less, 28 g-Ba/L or less, 26 g-Ba/L or less, 24 g-Ba/L or less, 22 g-Ba/L or less, 20 g-Ba/L or less, or 18 g-Ba/L or less.

From the viewpoint of exhibiting the effect of suppressing the poisoning of palladium by the barium compound, the barium compound in the first catalytic coating layer may be present in a significant amount with respect to palladium. The mass (metal-barium equivalent value per 1 L of substrate capacity) of barium in the first catalytic coating layer with respect to the mass (metal-palladium equivalent value per 1 L of substrate capacity) of palladium may be, for example, 0.1 times or greater, 0.2 times or greater, 0.5 times or greater, 0.7 times or greater, or 1.0 times or greater. From the viewpoint of suppressing the adverse effect on rhodium in the second catalytic coating layer, the value may be, for example, 5.0 times or less, 4.0 times or less, 3.0 times or less, 2.0 times or less, or 1.5 times or less.

(Inorganic Oxide Particles)

The first catalytic coating layer comprises inorganic oxide particles. The inorganic oxide particles may be, for example, oxygen storage/release material particles or particles of an inorganic oxide other than an oxygen storage/release material.

—Oxygen Storage/Release Material Particles—

In the first catalytic coating layer, the oxygen storage/release material particles may be, for example, ceria (pure ceria) or particles of a composite oxide containing ceria. The composite oxide containing ceria may be a composite oxide containing cerium and one or more metallic elements selected from aluminum, silicon, titanium, zirconium, and rare earth elements. The composite oxide is preferably a composite oxide containing cerium and zirconium, and may be a composite oxide of cerium and zirconium (ceria-zirconia composite oxide).

The ceria concentration in the composite oxide containing ceria may be appropriately set in accordance with the desired value of ceria concentration contained in the first catalytic coating layer, and can be exemplified in the range of, for example, 10% or greater and 90% or less by mass.

The ceria in the first catalytic coating layer may comprise a portion contained as pure ceria and a portion contained as a composite oxide containing ceria in an overlaid manner.

As the ceria content in the first catalytic coating layer, the mass ratio (g/L) allocated per 1 L of substrate capacity, may be, for example, 5 g/L or more, 10 g/L or more, 15 g/L or more, or 20 g/L or more, and may be, for example, 50 g/L or less, 45 g/L or less, 40 g/L or less, 35 g/L or less, or 30 g/L or less.

When the ceria in the first catalytic coating layer is contained as a composite oxide containing ceria, the "ceria content" refers to the mass of ceria (cerium(IV) oxide, $CeO_2$) converted from the elemental cerium in the composite oxide.

—Particles of Inorganic Oxide Other than Oxygen Storage/Release Material—

In the first catalytic coating layer, the particles of the inorganic oxide other than an oxygen storage/release material may be, for example, particles of one or more oxides selected from aluminum, silicon, titanium, zirconium, and rare earth elements. The inorganic oxide composed of particles of an inorganic oxide other than an oxygen storage/release material is preferably one or more selected from alumina, silica, silica-alumina, zeolite, titania, zirconia, ceria, and oxides of rare earth elements other than ceria. The inorganic oxide more preferably comprises a metal oxide, and particularly preferably comprises alumina.

(Binder)

The first catalytic coating layer may comprise a binder. The binder may be, for example, alumina sol, zirconia sol, silica sol, or titania sol.

(Support of Palladium)

The palladium in the first catalytic coating layer may be supported, preferably as microparticles, on particles of a suitable inorganic oxide. The inorganic oxide particles, which are carriers of the palladium, may be either oxygen storage/release material particles or particles of an inorganic oxide other than an oxygen storage/release material. The palladium in the first catalytic coating layer may be supported on particles of an inorganic oxide other than an oxygen storage/release material, and may be supported on alumina particles specifically.

The supported amount of palladium on the inorganic oxide particles as a ratio of the mass (metal-equivalent value) of palladium to the total mass of the palladium supported inorganic oxide particles may be, for example, 1.0% by mass or greater, 2.0% by mass or greater, 3.0% by mass or greater, 4.0% by mass or greater, or 5.0% by mass or greater, and may be, for example, 15.0% by mass or less, 12.0% by mass or less, 10.0% by mass or less, or 8.0% by mass or less.

(Coating Amount of First Catalytic Coating Layer)

The first catalytic coating layer amount, as the mass of the first catalytic coating layer per 1 L of substrate capacity, may be, for example, 50 g/L or more, 60 g/L or more, 80 g/L or more, 100 g/L or more, 120 g/L or more, or 150 g/L or more, and may be, for example, 300 g/L or less, 280 g/L or less, 250 g/L or less, 220 g/L or less, 200 g/L or less, 180 g/L or less, or 150 g/L or less.

When the first catalytic coating layer has a zonal structure including a front-stage portion and a back-stage portion, the total value of the mass of the front-stage portion and the mass of the back-stage portion may be adopted as the mass of the first catalytic layer.

<Second Catalytic Coating Layer>

The exhaust gas purification catalytic device has a second catalytic coating layer on the first catalytic coating layer. The second catalytic coating layer comprises alumina particles and rhodium supported on the alumina particles, and may further comprise an optional component in addition thereto. The optional component in the second catalytic coating layer may be, for example, a noble metal other than rhodium, inorganic oxide particles other than alumina particles, or a binder.

(Rhodium)

The second catalytic coating layer comprises rhodium supported on alumina particles as described below.

The amount of rhodium in the second catalytic coating layer may be appropriately determined according to the application of the exhaust gas purification catalytic device. From the viewpoint of ensuring good exhaust gas purification activity, the metal-rhodium equivalent value per 1 L of substrate capacity may be, for example, 0.01 g-Rh/L or more, 0.05 g-Rh/L or more, 0.10 g-Rh/L or more, 0.15 g-Rh/L or more, or 0.20 g-Rh/L or more. From the viewpoint of controlling the amount of rhodium that does not contribute to the exhaust gas purification reaction and not making the exhaust gas purification catalytic device overly expensive, the value may be, for example, 1.0 g-Rh/L or less, 0.8 g-Rh/L or less, 0.7 g-Rh/L or less, 0.6 g-Rh/L or less, 0.5 g-Rh/L or less, or 0.4 g-Rh/L or less.

To exhibit a purification performance balanced among all of HCs, CO, and $NO_x$ for the exhaust gas purification catalytic device of the present invention, the ratio of palladium content in the first catalytic coating layer to rhodium content in the second catalytic coating layer may be within a suitable range. The mass (metal-equivalent value per 1 L of substrate capacity) of rhodium in the second catalytic coating layer with respect to the mass (metal-palladium equivalent value per 1 L of substrate capacity) of palladium in the first coating layer may be, for example, 0.01 times or greater, 0.02 times or greater, 0.03 times or greater, 0.04 times or greater, or 0.05 times or greater, and may be, for example, 0.15 times or less, 0.12 times or less, 0.10 times or less, 0.09 times or less, or 0.08 times or less.

In the second catalytic coating layer, the rhodium may be arranged substantially evenly in the length direction of the substrate. Due to this configuration, a "blowout", in which NOx passes through the catalytic coating layer unreacted, can be suppressed in a high-load region such as a high SV period, and the purification rate of $NO_x$ in a high-load region can be improved.

In the second catalytic coating layer, the ratio ($Rh_{Fr}/Rh_{Rr}$) of the amount ($Rh_{Fr}$) of rhodium contained in a range up to 20% of the total length of the substrate from an exhaust gas flow upstream end portion to the amount ($Rh_{Rr}$) of rhodium contained in a range up to 20% of the total length of the substrate from an exhaust gas flow downstream end portion may be, for example, 0.90 or greater, 0.92 or greater, 0.94 or greater, 0.96 or greater, or 0.98 or greater, and may be, for example, 1.10 or less, 1.08 or less, 1.06 or less, 1.04 or less, or 1.02 or less, or the ratio may be 1.00.

(Noble Metals Other than Rhodium)

The second catalytic coating layer may or may not comprise a noble metal catalyst other than rhodium. The second catalytic coating layer is preferably substantially free of a noble metal catalyst other than rhodium. When the second catalytic coating layer is "substantially free" of a noble metal catalyst other than rhodium, the ratio of the mas of the noble metal catalyst other than rhodium to the total mass of the noble metal catalyst contained in the second catalytic coating layer is, for example, 15% by mass or less, 10% by mass or less, 5% by mass of less, 3% by mass or less, 1% by mass or less, 0.5% by mass or less, 0.3% by mass or less, 0.1% by mass or less, or 0% by mass.

(Alumina Particles)

The second catalytic coating layer comprises alumina particles. The alumina particles contained in the second catalytic coating layer may be particles of α-alumina, γ-alumina, δ-alumina, or θ-alumina. From the viewpoint of utilizing an effect of the present invention of supporting rhodium while suppressing the migration thereof, an alumina with a high specific surface area is preferable. Specifically, θ-alumina particles may be used. As the alumina particles, alumina particles having improved heat resistance by containing a rare earth element such as lanthanum may be used. The specific surface area of the alumina particles, measured by the BET method, may be, for example, 80 m²/g or greater, 90 m²/g or greater, or 100 m²/g or greater, and may be, for example, 120 m²/g or less, 110 m²/g or less, or 100 m²/g or less.

(Support of Rhodium)

The rhodium in the second catalytic coating layer may be supported, preferably as microparticles, on alumina particles. In the second catalytic coating layer, the migration of rhodium is suppressed by supporting the rhodium on alumina particles exhibiting a high specific surface area. It is considered thereby that the migration of rhodium across a catalytic coating layer boundary and the decrease in catalytic activity caused by the alloying with palladium can be suppressed.

The supported amount of rhodium on the alumina particles as a ratio of the mass (metal-equivalent value) of rhodium to the total mass of the rhodium supported alumina particles may be, for example, 0.01% by mass or greater, 0.05% by mass or greater, 0.10% by mass or greater, 0.20% by mass or greater, or 0.30% by mass or greater, and may be, for example, 2.00% by mass or less, 1.50% by mass or less, 1.00% by mass or less, 0.80% by mass or less, 0.60% by mass or less, or 0.50% by mass or less.

(Inorganic Oxide Particles Other than Alumina Particles)

The second catalytic coating layer may comprise inorganic oxide particles other than alumina particles. The inorganic oxide particles other than alumina particles may be, for example, oxygen storage/release material particles or particles of an inorganic oxide other than an oxygen storage/release material. The description of the inorganic oxide particles, except for alumina particles, in the first catalytic coating layer may be adopted as-is for that of the inorganic oxide particles in the second catalytic coating layer.

(Binder)

The second catalytic coating layer may comprise a binder. The description of the binder in the first catalytic coating layer may be adopted as-is for that in the second catalytic coating layer.

<Ratio of the Mass of Barium in First Catalytic Coating Layer to the Mass of Rhodium in Second Catalytic Coating Layer>

In the exhaust gas purification catalytic device of the present invention, the amount of barium in the first catalytic coating layer is limited with respect to the amount of rhodium in the second catalytic coating layer.

To demonstrate the function of suppressing deterioration of catalytic activity caused by the poisoning of palladium, a barium compound is contained in the first catalytic coating layer of the exhaust gas purification catalytic device of the present invention. However, barium compounds have a high affinity for rhodium and attract rhodium ionically or through an acid-base interaction, promoting the migration of rhodium across a layer boundary. By limiting the amount of barium in the first catalytic coating layer with respect to the amount of rhodium in the second catalytic coating layer, the migration of rhodium across a layer boundary is suppressed.

In the exhaust gas purification device of the present invention, the ratio ($M_{Ba}/M_{Rh}$) of the mass ($M_{Ba}$) of barium in the first catalytic coating layer to the mass ($M_{Rh}$) of rhodium in the second catalytic coating layer is 5.0 to 60.0. The value may be, for example, 6.0 or greater, 8.0 or greater, 10.0 or greater, 12.0 or greater, 15.0 or greater, or 20.0 or greater, and may be, for example, 58.0 or less, 55.0 or less, 50.0 or less, 45.0 or less, 40.0 or less, 35.0 or less, or 30.0 or less.

(Zonal Structure)

The second catalytic coating layer may have a "zonal structure" including a front-stage portion of the exhaust gas flow upstream side and a back-stage portion of the exhaust gas flow downstream side. The presence or absence, type, or amount of one or more of the constituents may or may not be different between the front-stage portion and the back-stage portion of the second catalytic coating layer. When the second catalytic coating layer has a zonal structure including a front-stage portion and a back-stage portion, there may be a region in which the front-stage portion and the back-stage portion of the second catalytic coating layer are stacked on the first catalytic coating layer near the center in the length direction of the substrate.

(Coating Amount of Second Catalytic Coating Layer)

The second catalytic coating layer amount, as the mass of the second catalytic coating layer per 1 L of substrate capacity, may be, for example, 50 g/L or more, 60 g/L or more, 80 g/L or more, 100 g/L or more, 120 g/L or more, or 150 g/L or more, and may be, for example, 300 g/L or less, 280 g/L or less, 250 g/L or less, 220 g/L or less, 200 g/L or less, 180 g/L or less, or 150 g/L or less.

When the second catalytic coating layer has a zonal structure including a front-stage portion and a back-stage portion, the total value of the mass of the front-stage portion and the mass of the back-stage portion may be adopted as the mass of the second catalytic coating layer.

<<Method for Manufacturing Exhaust Gas Purification Catalytic Device>>

The exhaust gas purification catalytic device of the present invention may be manufactured by any method.

The exhaust gas purification catalytic device of the present invention, for example, may be manufactured by a method of sequentially forming, on a substrate, a first catalytic coating layer (front-stage portion and back-stage portion) and a second catalytic coating layer.

<Substrate>

As a substrate, a desired substrate which an exhaust gas purification catalytic device should have may be selected and used. As described above, the substrate is, for example, a straight-type or wall flow-type monolithic honeycomb substrate made of cordierite, SiC, stainless steel, or inorganic oxide particles.

<Formation of First Catalytic Coating Layer>

The first catalytic coating layer is formed on such a substrate. When more palladium is arranged on the exhaust gas flow upstream side in the first catalytic coating layer, forming the first catalytic coating layer with a zonal structure composed of a front-stage portion and a back-stage portion is useful. Hereinafter, the formation of the first catalytic coating layer having a zonal structure will be described.

The first catalytic coating layer front-stage portion may be formed by, for example, coating up to a predetermined range of the total length of the substrate from an exhaust gas flow upstream end portion of the substrate with a coating liquid for forming the first catalytic coating layer front-stage portion, followed by drying and baking. The first catalytic coating layer back-stage portion may be formed by, for example, coating up to a predetermined range of the total length of the substrate from an exhaust gas flow downstream end portion of the substrate with a coating liquid for forming the first catalytic coating layer back-stage portion, followed by drying and baking. The front-stage portion and the back-stage portion of the first catalytic coating layer may be formed in any order.

Alternatively, another method may be used in which up to a predetermined range of the total length of the substrate from the exhaust gas flow upstream end portion of the substrate is coated with the coating liquid for forming the first catalytic coating layer front-stage portion and thereafter dried; subsequently, up to a predetermined range of the total length of the substrate from the exhaust gas flow downstream end portion is coated with the coating liquid for forming the first catalytic coating layer back-stage portion and thereafter dried, and then the front-stage portion and the back-stage portion are baked together. The coating order of the liquid for forming the front-stage portion and the coating liquid for forming the back-stage portion may be reversed from what is described above.

The coating liquid for forming the first catalytic coating layer front-stage portion and the coating liquid for forming the first catalytic coating layer back-stage portion may each be a liquid composed of a suitable solvent (for example, water) in which desired components contained in the first catalytic coating layer front-stage portion or back-stage portion are dissolved or dispersed. It is preferable that the palladium in the first catalytic coating layer be preliminarily supported on inorganic oxide particles and contained as palladium supported inorganic oxide particles in the coating liquid.

The palladium supported inorganic oxide particles can be obtained by, for example, charging a palladium precursor and inorganic oxide particles in a suitable solvent (for example, water), followed by drying and baking. The palladium precursor may be, for example, palladium nitrate, palladium sulfate, or palladium chloride.

Coating of the coating liquid, and drying and baking after coating may each be carried out according to a publicly known method.

<Formation of Second Catalytic Coating Layer>

The second catalytic coating layer is subsequently formed on the substrate having the first catalytic coating layer formed thereon.

The second catalytic coating layer may be formed by, for example, coating the substrate having the first catalytic coating layer formed thereon with a coating liquid for forming the second catalytic coating layer, followed by drying and baking.

The coating liquid for the second catalytic coating layer may be a liquid composed of a suitable solvent (for example, water) in which desired components contained in the second catalytic coating layer are dissolved or dispersed. It is preferable that the rhodium in the second catalytic coating layer be preliminarily supported on alumina particles and contained as rhodium supported alumina particles in the coating liquid.

The rhodium supported alumina particles can be obtained by, for example, charging a rhodium precursor and alumina particles in a suitable solvent (for example, water), followed by drying and baking. The rhodium precursor may be, for example, rhodium nitrate, rhodium chloride, rhodium sodium chloride, rhodium pentamine chloride, or carbonyl acetyl rhodium.

Coating of the coating liquid, and drying and baking after coating may each be carried out according to a publicly known method.

The exhaust gas purification catalytic device of the present invention can be manufactured according to the above method. However, the method described above is merely one example of the method for manufacturing the exhaust gas purification catalytic device of the present invention. The exhaust gas purification catalytic device of the present invention may be manufactured according to any method other than the one described above.

EXAMPLES

In the following Examples and Comparative Examples, a straight-type monolithic honeycomb substrate made of cordierite, having a length of 114.3 mm, a diameter of 118.4 mm, and a capacity of 1,259 mL was used as the substrate.

In the preparation of the following coating liquids, the unit "g/L", which is the mass of material per 1 L of substrate capacity, was adopted as the reduced mass in terms of the metal atom for the amount used of each of palladium nitrate, rhodium nitrate, and barium sulfate.

Example 1

<Preparation of Coating Liquid for Forming First Catalytic Coating Layer Front Stage>

Palladium nitrate at an amount corresponding to the metal-palladium equivalent of 5.16 g-Pd/L and 60.0 g/L of alumina particles (specific surface area of 100 $m^2$/g by the BET method) were charged in pure water and stirred well; thereafter, recovered solids were dried and baked to obtain palladium supported alumina particles. The entire amount of obtained palladium supported alumina particles, 60.0 g/L of ceria-zirconia composite oxide particles (ceria content of 30% by mass), barium nitrate at an amount corresponding to the metal-barium equivalent of 18.0 g-Ba/L, and alumina sol as a binder were charged in pure water and stirred to prepare a coating liquid for forming the first catalytic coating layer front stage.

<Preparation of Coating Liquid for Forming First Catalytic Coating Layer Back Stage>

Except for setting the amount used of palladium nitrate to an amount corresponding to the metal-palladium equivalent of 3.43 g-Pd/L, the coating liquid for forming the first catalytic coating layer back stage was prepared in the same manner as "Preparation of coating liquid for forming first catalytic coating layer front stage".

<Preparation of Coating Liquid for Forming Second Catalytic Coating Layer>

0.31 g-Rh/L of rhodium nitrate and 70.0 g/L of alumina particles were charged in pure water and stirred well; thereafter, recovered solids were dried and baked to obtain rhodium supported alumina particles. The entire amount of the obtained rhodium alumina particles, 42.0 g/L of ceria-zirconia composite oxide particles (ceria content of 21% by mass), and alumina sol as a binder were charged in pure water and stirred to prepare a coating liquid for forming the second catalytic coating layer.

<Manufacturing of Exhaust Gas Purification Catalytic Device>

The coating liquid for forming the first catalytic coating layer back stage was poured on the substrate in a range of 50% of the total length thereof from the exhaust gas flow downstream side of the substrate, and the unnecessary coating liquid was blown off with a blower, whereby the range of 50% of the exhaust gas flow downstream side of the substrate was coated with the coating liquid for forming the first catalytic coating layer back stage. The coated substrate was then allowed to settle at 120° C. for 2 hours in a dryer to dry and thereafter baked in an electric furnace at 500° C. for 2 hours to obtain a substrate having a first catalytic coating layer back-stage portion.

The coating liquid for forming the first catalytic coating layer front stage was poured on the substrate having thereon the first catalytic coating layer back-stage portion in a range of 50% of the total length of the substrate from the exhaust gas flow upstream side thereof. Thereafter, a first catalytic coating layer front-stage portion of a catalytic coating layer was formed, in the same manner as forming the first catalytic coating layer back-stage portion, to obtain a substrate having a first catalytic coating layer.

The coating liquid for forming the second catalytic coating layer front stage was poured on the substrate having thereon the first catalytic coating layer over the entire length of the substrate. Thereafter, a second catalytic coating layer was formed on the first catalytic coating layer, in the same manner as forming the first catalytic coating layer back-stage portion, to manufacture the exhaust gas purification catalytic layer of Example 1. The ratio ($M_{Ba}/M_{Rh}$) of the mass ($M_{Ba}$) of barium in the first catalytic coating layer to the mass ($M_{Rh}$) of rhodium in the second catalytic coating layer in the exhaust gas purification catalytic device was 18.0/0.31=58.1.

<Evaluation of Exhaust Gas Purification Ability>

(1) Endurance Running

Endurance running of the exhaust gas purification catalytic device was carried out using a gasoline engine on a stand. The obtained exhaust gas purification catalytic device was mounted in a V-type, 8-cylinder engine having a displacement of 4,608 mL. Using a catalyst bed temperature of 1,000° C., endurance running was carried out for 50 hours by a method in which exhaust gas flows alternately and repeatedly between a stoichiometric atmosphere and a lean atmosphere at constant time intervals.

(2) Evaluation a) Evaluation of Warm-Up Performance

Warm-up performance of the exhaust gas purification catalytic device was evaluated using a gasoline engine (displacement of 2,493 mL, inline 4-cylinder engine) on a stand. An exhaust gas purification catalytic device after endurance running was mounted in the gasoline engine. The catalyst bed temperature was cooled to 60° C. Thereafter, the intake air amount was set to 22 g/second, and exhaust gas in a stoichiometric atmosphere adjusted to a temperature of 520° C. was circulated. The time (WU value) from the start of circulation of the exhaust gas to the purification rate of HCs reaching 50% was used as an indicator of warm-up performance.

b) Evaluation of $NO_x$ Purification Ability Under High-Load Conditions $NO_x$ purification ability of the exhaust gas purification catalytic device was evaluated using a gasoline engine (displacement of 2,493 mL, inline 4-cylinder engine) on a stand. An exhaust gas purification catalytic device after endurance running was mounted in the gasoline engine. The intake air amount was set to 35 g/second, and the entering gas temperature was raised from 200° C. at a temperature increase rate of 10° C./minute while exhaust gas in a stoichiometric atmosphere was circulated. The entering gas temperature (T50-$NO_x$) when the $NO_x$ purification rate reached 50% was used as an indicator of purification ability.

Examples 2 to 5 and Comparative Examples 1 and 2

Each exhaust gas purification catalytic device was manufactured and evaluated in the same manner as in Example 1, except for the amount used of each component when preparing each coating liquid, as indicated in Table 1. The evaluation results, as well as the ratio of Ba in the first catalytic coating layer/Rh in the second catalytic coating layer in the exhaust gas purification catalytic device obtained in each of the Examples and Comparative Examples, are shown in Table 1.

Example 6

<Preparation of Coating Liquid for Forming Catalytic Layer>

Each coating liquid for forming a catalytic layer was prepared in the same manner as in Example 1, except for the amount used of each component, as indicated in Table 2. The coating liquid for forming the second catalytic coating layer having the same composition was used to form the second catalytic coating layer front-stage portion and back-stage portion.

<Manufacturing of Exhaust Gas Purification Catalytic Device>

The coating liquid for forming the first catalytic coating layer back stage was poured on the substrate in a range of 60% of the total length of thereof from the exhaust gas flow downstream side, and the unnecessary coating liquid was blown off with a blower, whereby the range of 60% of the exhaust gas flow downstream side of the substrate was coated with the coating liquid for forming the first catalytic coating layer back stage. The coated substrate was then allowed to settle at 120° C. for 2 hours in a dryer to dry and thereafter baked at 500° C. for 2 hours in an electric furnace to obtain a substrate having a first catalytic coating layer back-stage portion.

The coating liquid for forming the first catalytic coating layer front stage was poured on the substrate having thereon the first catalytic coating layer back-stage portion in a range of 60% of the total length of the substrate from the exhaust gas flow upstream side. Thereafter, a first catalytic coating layer front-stage portion was formed, in the same manner as forming the first catalytic coating layer back-stage portion, to obtain a substrate having a first catalytic coating layer. The first catalytic coating layer front-stage portion and the first catalytic coating layer front-stage portion were stacked, in a range of 20% of the total length of the substrate, in the first catalytic coating layer front-stage portion and first catalytic coating layer front-stage portion on the center portion of the substrate.

The coating liquid for forming the second catalytic coating layer back stage was poured on the substrate having thereon the first catalytic coating layer in a range of 70% of the total length of the substrate from the exhaust gas flow downstream side. Thereafter, a second catalytic coating layer back-stage portion was formed, in the same manner as forming the first catalytic coating layer back-stage portion.

The coating liquid for forming the second catalytic coating layer front stage was poured on the substrate having thereon the first catalytic coating layer and the second catalytic coating layer back-stage portion in a range of 70% of the total length of the substrate from the exhaust gas flow upstream side. Thereafter, a second catalytic coating layer front-stage portion was formed, in the same manner as the first catalytic coating layer back-stage portion, to manufacture the exhaust gas purification catalytic device of Example 6. The ratio ($M_{Ba}/M_{Rh}$) of the mass ($M_{Ba}$) of barium in the first catalytic coating layer to the mass ($M_{Rh}$) of rhodium in the second catalytic coating layer in this exhaust gas purification catalytic device was (15.0×1.2)/(0.22×1.4)=58.1.

<Evaluation of Exhaust Gas Purification Ability>

Exhaust gas purification ability was evaluated in the same manner as in Example 1, except that the respective exhaust gas purification catalytic devices obtained were used. The results are shown in Table 2.

Example 7 and Comparative Examples 3 and 4

Each exhaust gas purification catalytic device was manufactured and evaluated in the same manner as in Example 1, except for the amount used of each component when preparing each coating liquid, as indicated in Table 3. The evaluation results, as well as the ratio of Ba in the first catalytic coating layer/Rh in the second catalytic coating layer in the exhaust gas purification catalytic device obtained in each of the Examples and Comparative Examples, are shown in Table 3.

Figure 3:
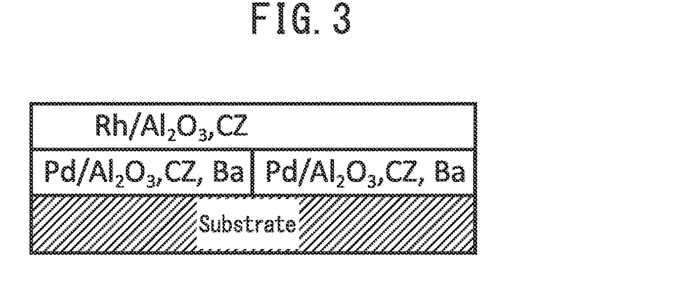
FIG. 3 is a schematic cross-sectional view showing a layer configuration of the exhaust gas purification catalytic device manufactured in Examples 1 to 5 and 7 and Comparative Examples 1 to 4.
Figure 4:
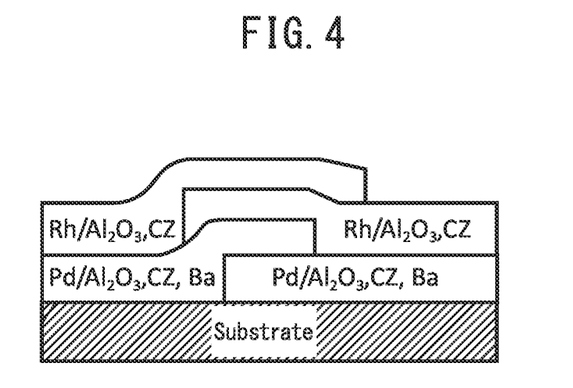
FIG. 4 is a schematic cross-sectional view showing a layer configuration of the exhaust gas purification catalytic device manufactured in Example 6.

The layer configuration of the exhaust gas purification catalytic device of Examples 1 to 5 and 7 and Comparative Examples 1 to 4 is shown in FIG. 3. The layer configuration of the exhaust gas purification catalytic device of Example 6 is shown in FIG. 4.

compared to the exhaust gas purification catalytic devices of the Comparative Examples which do not satisfy the ratio ($M_{Ba}/M_{Rh}$) of the mass ($M_{Ba}$) of barium in the first catalytic coating layer to the mass ($M_{Rh}$) of rhodium in the second catalytic coating layer in the predetermined range of the present invention of 5.0 to 60.0, it was found in the exhaust gas purification catalytic devices of the Examples which satisfy the predetermined requirements of the present invention

TABLE 1

| | First catalytic coating layer (lower layer) | | | | Second catalytic coating layer (upper layer) | | Exhaust gas purification performance | |
|---|---|---|---|---|---|---|---|---|
| | Front-stage portion (50% coating) | | Back-stage portion (50% coating) | | | | | $NO_x$ purification |
| | Pd (g-Pd/L) | Barium sulfate (g-Ba/L) | Pd (g-Pd/L) | Barium sulfate (g-Ba/L) | (100% coating) Rh (g-Rh/L) | Lower layer Ba/upper layer Rh | Warm-up (WU value) (s) | performance (T50-$NO_x$) (° C.) |
| Ex. 1 | 5.16 | 18.0 | 3.43 | 18.0 | 0.31 | 58.1 | 24.3 | 326 |
| Ex. 2 | 5.16 | 12.0 | 3.43 | 12.0 | 0.31 | 38.7 | 24.2 | 323 |
| Ex. 3 | 5.16 | 6.0 | 3.43 | 6.0 | 0.31 | 19.4 | 23.9 | 318 |
| Ex. 4 | 5.16 | 3.6 | 3.43 | 3.6 | 0.31 | 11.6 | 23.8 | 320 |
| Ex. 5 | 5.16 | 1.8 | 3.43 | 1.8 | 0.31 | 5.8 | 24.0 | 326 |
| Comp. Ex. 1 | 5.16 | 24.0 | 3.43 | 24.0 | 0.31 | 77.4 | 24.7 | 331 |
| Comp. Ex. 2 | 5.16 | 0.0 | 3.43 | 0.0 | 0.31 | 0.0 | 24.2 | 334 |

TABLE 2

| | First catalytic coating layer (lower layer) | | | | Second catalytic coating layer (upper layer) | | | | Exhaust gas purification performance | |
|---|---|---|---|---|---|---|---|---|---|---|
| | Front-stage portion (60% coating) | | Back-stage portion (60% coating) | | Front-stage portion | Back-stage portion | | | | $NO_x$ purification |
| | Pd (g-Pd/L) | Barium sulfate (g-Ba/L) | Pd (g-Pd/L) | Barium sulfate (g-Ba/L) | (70% coating) Rh (g-Rh/L) | (70% coating) Rh (g-Rh/L) | Lower layer Ba/upper layer Rh | Warm-up (WU value) (s) | performance (T50-$NO_x$) (° C.) | |
| Ex. 6 | 4.32 | 15.0 | 2.86 | 15.0 | 0.22 | 0.22 | 58.1 | 24.3 | 326 | |

TABLE 3

| | First catalytic coating layer (lower layer) | | | | Second catalytic coating layer (upper layer) | | Exhaust gas purification performance | |
|---|---|---|---|---|---|---|---|---|
| | Front-stage portion (50% coating) | | Back-stage portion (50% coating) | | | | | $NO_x$ purification |
| | Pd (g-Pd/L) | Barium sulfate (g-Ba/L) | Pd (g-Pd/L) | Barium sulfate (g-Ba/L) | (100% coating) Rh (g-Rh/L) | Lower layer Ba/upper layer Rh | Warm-up (WU value) (s) | performance (T50-$NO_x$) (° C.) |
| Ex. 7 | 2.06 | 1.20 | 1.38 | 1.20 | 0.092 | 13.0 | 26.3 | 346 |
| Comp. Ex. 3 | 2.06 | 6.00 | 1.38 | 6.00 | 0.092 | 65.2 | 28.7 | 363 |
| Comp. Ex. 4 | 2.06 | 0.00 | 1.38 | 0.00 | 0.092 | 0.0 | 27.3 | 366 |

When comparing the Examples and Comparative Examples having the same noble metal content from the above results, that the warm-up and the $NO_x$ purification ability under high-load conditions are compatible with a high degree of balance.

REFERENCE SIGNS LIST 1 first catalytic coating layer
1a first catalytic coating layer front-stage portion
1b first catalytic coating layer back-stage portion
2 second catalytic coating layer
3 substrate
10, 20 exhaust gas purification catalytic device
$Rh/Al_2O_3$ rhodium supported alumina particles
$Pd/Al_2O_3$ palladium supported alumina particles
Pd/MO palladium supported inorganic oxide particles
CZ ceria-zirconia composite oxide particles
Ba barium compound

The invention claimed is:

1. An exhaust gas purification catalytic device, comprising
   a substrate, a first catalytic coating layer on the substrate, and a second catalytic coating layer on the first catalytic coating layer, wherein:
   the first catalytic coating layer comprises inorganic oxide particles, palladium supported on the inorganic oxide particles, and a barium compound,
   the second catalytic coating layer comprises alumina particles and rhodium supported on the alumina particles, and
   the ratio ($M_{Ba}/M_{Rh}$) of the mass ($M_{Ba}$) of barium in the first catalytic coating layer to the mass ($M_{Rh}$) of rhodium in the second catalytic coating layer is 5.0 or greater and 60.0 or less.

2. The exhaust gas purification catalytic device according to claim 1, wherein the ratio ($M_{Ba}/M_{Rh}$) of the mass ($M_{Ba}$) of barium in the first catalytic coating layer to the mass ($M_{Rh}$) of rhodium in the second catalytic coating layer is 6.0 or greater and 58.0 or less.

3. The exhaust gas purification catalytic device according to claim 2, wherein the ratio ($M_{Ba}/M_{Rh}$) of the mass ($M_{Ba}$) of barium in the first catalytic coating layer to the mass ($M_{Rh}$) of rhodium in the second catalytic coating layer is 10.0 or greater and 40.0 or less.

4. The exhaust gas purification catalytic device according to claim 1, wherein the first catalytic coating layer has a ratio ($Pd_{Fr}/Pd_{Rr}$) of an amount of palladium ($Pd_{Fr}$) contained in a range up to 20% of the total length of the substrate from an exhaust gas flow upstream end portion to an amount of palladium ($Pd_{Rr}$) in a range up to 20% of the total length of the substrate from an exhaust gas flow downstream end portion of greater than 1.0 and 3.0 or less.

5. The exhaust gas purification catalytic device according to claim 1, wherein the second catalytic coating layer has a ratio ($Rh_{Fr}/Rh_{Rr}$) of an amount of rhodium ($Rh_{Fr}$) contained in a range up to 20% of the total length of the substrate from an exhaust gas flow upstream end portion to an amount of rhodium ($Rh_{Rr}$) contained in a range up to 20% of the total length of the substrate from an exhaust gas flow downstream end portion of 0.90 or greater and 1.10 or less.

6. The exhaust gas purification catalytic device according to claim 1, wherein the first catalytic coating layer comprises oxygen storage/release material particles and particles of an inorganic oxide other than an oxygen storage/release material.

7. The exhaust gas purification catalytic device according to claim 6, wherein the palladium in the first catalytic coating layer is supported on particles of an inorganic oxide other than an oxygen storage/release material.

8. The exhaust gas purification catalytic device according to claim 6, wherein the second catalytic coating layer further comprises oxygen storage/release material particles.

9. The exhaust gas purification catalytic device according to claim 8, wherein the oxygen storage/release material particles in the first catalytic coating layer and the second catalytic coating layer are, respectively, particles of one or more inorganic oxides selected from pure ceria and a composite oxide containing ceria.

10. The exhaust gas purification catalytic device according to claim 9, wherein the composite oxide containing ceria is a ceria-zirconia composite oxide.

11. The exhaust gas purification catalytic device according to claim 1, wherein
   the ratio ($M_{Ba}/M_{Rh}$) of the mass ($M_{Ba}$) of barium in the first catalytic coating layer to the mass ($M_{Rh}$) of rhodium in the second catalytic coating layer is 6.0 or greater and 58.0 or less,
   the first catalytic coating layer has a ratio ($Pd_{Fr}/Pd_{Rr}$) of an amount of palladium ($Pd_{Fr}$) contained in a range up to 20% of the total length of the substrate from an exhaust gas flow upstream end portion to an amount of palladium ($Pd_{Rr}$) in a range up to 20% of the total length of the substrate from an exhaust gas flow downstream end portion of greater than 1.0 and 3.0 or less, and
   the second catalytic coating layer has a ratio ($Rh_{Fr}/Rh_{Rr}$) of an amount of rhodium ($Rh_{Fr}$) contained in a range up to 20% of the total length of the substrate from an exhaust gas flow upstream end portion to an amount of rhodium ($Rh_{Rr}$) contained in a range up to 20% of the total length of the substrate from an exhaust gas flow downstream end portion of 0.90 or greater and 1.10 or less.

12. The exhaust gas purification catalytic device according to claim 11, wherein
   the first catalytic coating layer comprises oxygen storage/release material particles and particles of an inorganic oxide other than an oxygen storage/release material, and
   palladium in the first catalytic coating layer is supported on particles of an inorganic oxide other than an oxygen storage/release material.

13. The exhaust gas purification catalytic device according to claim 11, wherein the second catalytic coating layer further comprises oxygen storage/release material particles.

14. The exhaust gas purification catalytic device according to claim 11, wherein
   the second catalytic coating layer comprises a noble metal catalyst other than rhodium, and
   the ratio of the mass of the noble metal catalyst other than rhodium to the total mass of the noble metal catalyst contained in the second catalytic coating layer is 15% by mass or less.

15. The exhaust gas purification catalytic device according to claim 11, wherein the mass of rhodium in the second catalytic coating layer with respect to the mass of palladium in the first coating layer is 0.12 times or less.

16. The exhaust gas purification catalytic device according to claim 1, wherein
   the second catalytic coating layer comprises a noble metal catalyst other than rhodium, and
   the ratio of the mass of the noble metal catalyst other than rhodium to the total mass of the noble metal catalyst contained in the second catalytic coating layer is 15% by mass or less.

17. The exhaust gas purification catalytic device according to claim 1, wherein the mass of rhodium in the second catalytic coating layer with respect to the mass of palladium in the first coating layer is 0.12 times or less.

\* \* \* \* \*